United States Patent
Fimml et al.

(10) Patent No.: US 12,448,913 B2
(45) Date of Patent: Oct. 21, 2025

(54) PRE-CHAMBER ASSEMBLY

(71) Applicant: INNIO Jenbacher GmbH & Co OG, Jenbach (AT)

(72) Inventors: Wolfgang Fimml, Maurach in Tirol (AT); Rafal Pyszczek, Warsaw (PL); Tobias Triendl, Rinn (AT); Nikolaus Spyra, Innsbruck (AT); Philipp Volgger, Innsbruck (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 43 days.

(21) Appl. No.: 18/557,855

(22) PCT Filed: Apr. 28, 2021

(86) PCT No.: PCT/AT2021/060150
§ 371 (c)(1),
(2) Date: Oct. 27, 2023

(87) PCT Pub. No.: WO2022/226553
PCT Pub. Date: Nov. 3, 2022

(65) Prior Publication Data
US 2024/0209769 A1 Jun. 27, 2024

(51) Int. Cl.
*F02B 19/18* (2006.01)
*F02B 19/12* (2006.01)
*F02F 11/00* (2006.01)

(52) U.S. Cl.
CPC .............. *F02B 19/18* (2013.01); *F02B 19/12* (2013.01); *F02F 11/002* (2013.01)

(58) Field of Classification Search
CPC .......... F02B 19/18; F02B 19/12; F02B 19/08; F02B 19/1004; F02B 19/1014;
(Continued)

(56) References Cited

U.S. PATENT DOCUMENTS 2,153,598 A 4/1939 Steward
4,232,638 A * 11/1980 Takahashi ............ F02M 45/086
123/285

(Continued)

FOREIGN PATENT DOCUMENTS

EP 2713024 A1 4/2014
EP 2054593 B1 6/2014
(Continued)

OTHER PUBLICATIONS

PCT International Search Report and Written Opinion; Application No. PCT/AT2021/060150; dated Jan. 21, 2022; 12 pages.

*Primary Examiner* — Xiao En Mo
(74) *Attorney, Agent, or Firm* — Fletcher Yoder, P.C.

(57) ABSTRACT

A pre-chamber assembly of an internal combustion engine includes a supply channel configured to supply air and fuel into a pre-chamber, at least one transfer passage configured to couple the pre-chamber with a main combustion chamber, and a riser passage between the pre-chamber and the transfer passage. The riser passage is oblique relative to a longitudinal axis of the pre-chamber assembly. An ignition means and the supply channel are arranged on a proximal end of the pre-chamber assembly.

20 Claims, 6 Drawing Sheets

(58) Field of Classification Search
CPC ... F02B 19/1023; F02B 19/108; F02F 11/002; F02F 1/242
See application file for complete search history.

(56) References Cited

U.S. PATENT DOCUMENTS

| | | | |
|---|---|---|---|
| 4,903,656 A * | 2/1990 | Nakazono | F02D 41/345 |
| | | | 123/259 |
| 9,151,212 B2 | 10/2015 | Dumser et al. | |
| 9,316,144 B2 | 4/2016 | Gruber | |
| 10,316,733 B2 * | 6/2019 | Takemoto | F02B 19/16 |
| 10,770,868 B1 | 9/2020 | Gozawa | |
| 2013/0160734 A1 * | 6/2013 | Redtenbacher | F02B 19/108 |
| | | | 123/253 |
| 2013/0233273 A1 * | 9/2013 | Redtenbacher | F02B 19/00 |
| | | | 123/253 |
| 2014/0083391 A1 | 3/2014 | Gruber | |
| 2014/0251259 A1 * | 9/2014 | Dumser | F02M 21/0281 |
| | | | 123/260 |
| 2017/0122184 A1 * | 5/2017 | Hampson | F02D 41/402 |
| 2017/0218913 A1 * | 8/2017 | Kanehara | F02P 23/04 |
| 2019/0072025 A1 * | 3/2019 | Rabhi | F02B 19/18 |

FOREIGN PATENT DOCUMENTS

| | | |
|---|---|---|
| EP | 2894313 A1 | 7/2015 |
| EP | 3505734 A1 | 7/2019 |
| EP | 3460929 B1 | 7/2020 |

* cited by examiner

Fig. 6
Fig. 7
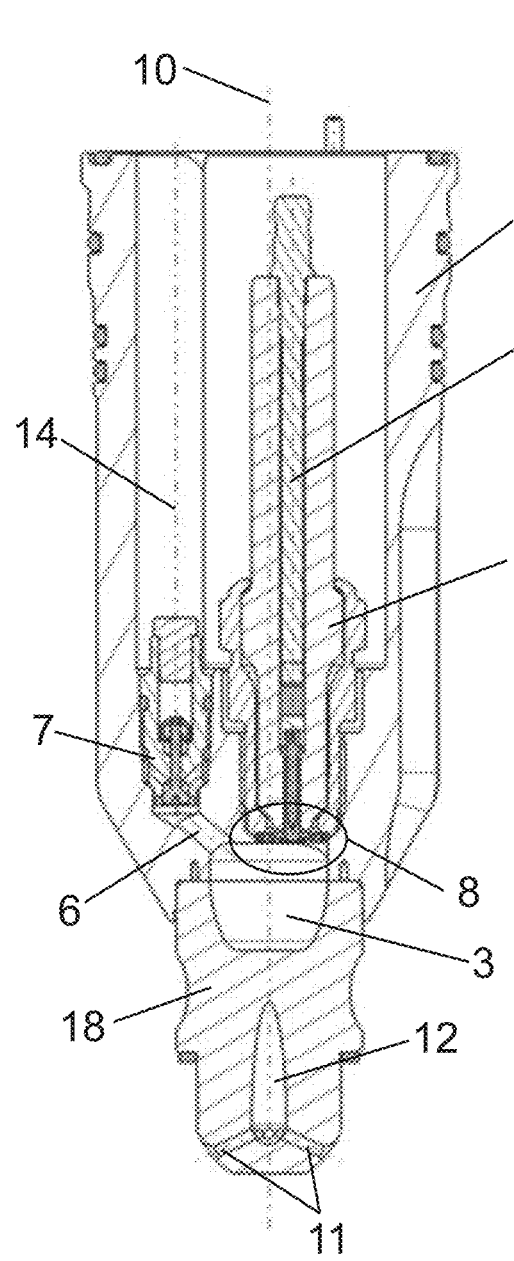
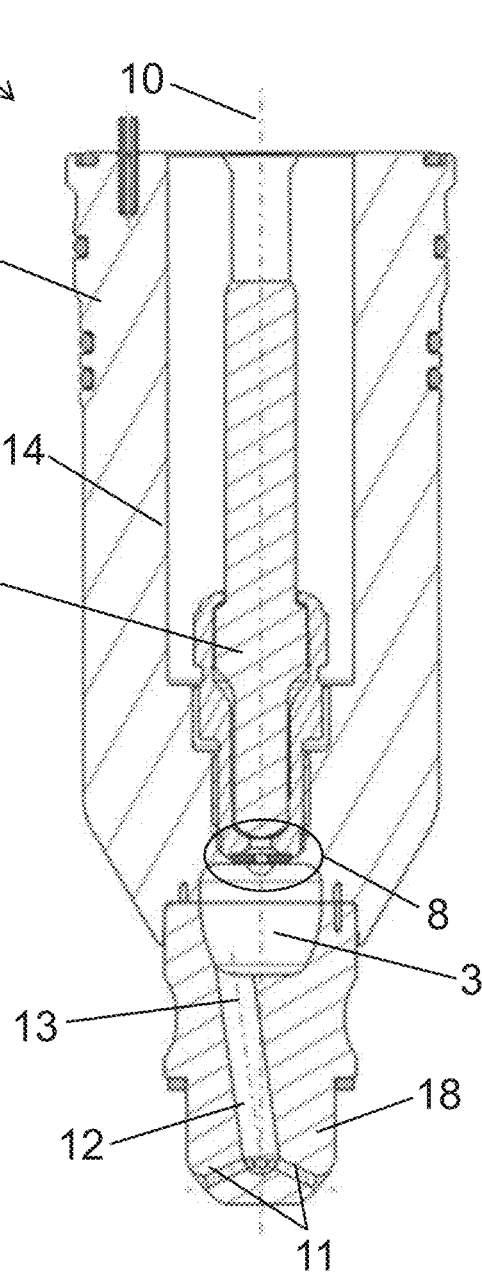

PRE-CHAMBER ASSEMBLY

CROSS-REFERENCE TO RELATED APPLICATION

This application is a National Stage entry from, and claims benefit of, PCT Application No. PCT/AT2021/060150, filed on Apr. 28, 2021, entitled "PRE-CHAMBER ASSEMBLY", which is herein incorporated by reference in its entirety.

BACKGROUND

The present invention relates to a pre-chamber assembly for an internal combustion engine, a cylinder head having such a pre-chamber assembly, and an internal combustion engine having such a pre-chamber assembly.

In Otto-cycle operated internal combustion engines, in particular in gas engines, in which a fuel-air mixture is ignited, for larger combustion chamber volumes often a lean burn concept is applied. This means that a relatively large air excess is present, so that at maximum power and simultaneously high efficiency of the engine, the harmful emissions and the thermal loading of the components are minimized. The ignition and combustion of very lean fuel-air mixtures represent a considerable challenge for the development and/or operation of modern high-performance gas engines.

Starting from a certain size of gas engines (generally with cylinder capacity above about four liters), it is beneficial to use ignition amplifiers, in order to properly ignite the lean air-fuel-mixture in the large volume of the cylinders.

Pre-chambers usually serve as these ignition intensifiers (see e.g. EP 2054593 B1), wherein the fuel-air mixture that is highly compressed at the end of the compression stroke is ignited in a relatively small secondary space separate from the main combustion chamber of the cylinders. A main combustion chamber may be delimited by the working piston, the cylinder liner forming a cylinder wall, and (a flame plate of) the cylinder head, wherein the secondary space (the pre-chamber) is connected via one or a plurality of transfer passages with the main combustion chamber.

Often these pre-chambers are flushed or filled with fuel gas during the gas exchange phase, in order to enrich the fuel-air mixture in the pre-chamber and thus improve the ignition and combustion properties. For this, a small amount of fuel gas may be diverted from the fuel supply line to the main combustion chamber and fed into the pre-chamber via a supply channel provided with a pre-chamber gas valve. This amount of fuel gas flushes the pre-chamber during gas exchange and so is known as flushing gas. There are also known methods for controlling pre-chambers, wherein the pre-chambers are flushed or scavenged by an air-fuel-mixture or by air.

During the compression phase, the very lean fuel-air mixture of the main combustion chamber flows through the transfer passages into the pre-chamber, where it mixes with the flushing gas. The ratio of fuel to air in the mixture is denoted as the excess-air coefficient $\lambda$. An excess-air coefficient of $\lambda=1$ means that the amount of air present in the mixture corresponds exactly to the amount that is required to allow complete combustion of that amount of fuel. In such a case, combustion takes place stoichiometrically.

At full load, large gas engines (using natural gas as supplied fuel) are usually run lean, at $\lambda$ of approx. 1.7 to 2.1, i.e., the amount of air in the mixture corresponds to about twice the stoichiometric amount of air. Owing to the flushing of the pre-chamber with fuel gas, after mixing with the fuel gas-air mixture of the main combustion chamber, an average $\lambda$ in the pre-chamber is approx. 0.8 to 1.4. Therefore, the ignition conditions are close to optimal and flame jets extend through the transfer passages into the main combustion chamber, which leads to a rapid, thorough combustion of the fuel-air mixture in the main combustion chamber.

To get an optimal ignition result and subsequently an optimal combustion process, pre-chambers may be provided centrically in the main combustion chamber at the cylinder head, wherein the flame jets can extend symmetrically into the main combustion chamber.

In the same way, it is known to arrange the ignition means centrically at the pre-chamber, wherein the ignition means ignites the present air-fuel mixture of the pre-chamber centrically at the pre-chamber to achieve a symmetrical and fast combustion.

The transfer passages (fluidically connected to the main combustion chamber) are typically connected via a riser passage with the pre-chamber. This riser passage is mostly used to connect the transfer passages with the pre-chamber.

Unfortunately, the turbulences generated in the pre-chamber during the compression stroke and the combustion stroke by fluid entering the pre-chamber through the riser passage substantially affects the ignition means arranged in the pre-chamber, because of the large thermal and mechanical load the ignition means, in particular electrodes of a spark plug, receives. This can significantly reduce the life time of the ignition means, resulting in higher maintenance requirements.

Such configurations known by the state of the art are disclosed, for example, by EP 3 460 929 B1 or EP2054593B1, wherein the riser passage extends in direction of a longitudinal axis of the pre-chamber assembly and enters the pre-chamber in a centrical portion. The spark plug and the pre-chamber gas valve are arranged asymmetrically at the pre-chamber to reduce the assembly space. Furthermore, the spark plug and the pre-chamber gas valve are arranged in such a way, that a back flow of fluid through the riser passage entering the pre-chamber does not hit the spark plug and the pre-chamber gas valve directly, such that the risk of damage can be reduced and the life time of the spark plug and the pre-chamber gas valve can be increased.

But, it is also known by the state of the art that an arrangement of the riser passage oblique with respect to a longitudinal axis of the pre-chamber assembly increases turbulences in the pre-chamber (as can be seen by EP 2 894 313 A1). To guarantee the functionality of the pre-chamber gas valve and the spark plug (to minimize the effects of thermal load generated by the raised turbulences on this component parts), a guide device is arranged. Furthermore, the riser passage is directed on the pre-chamber gas valve to reduce thermal load of the spark plug. A disadvantage of such a configuration is that this guide device is affected in large scale by deposits, such that the maintenance efforts have to be scaled up.

BRIEF DESCRIPTION

An aspect of the invention, in certain embodiments, is to provide a pre-chamber assembly for an internal combustion engine as well as a cylinder head and an internal combustion engine having such a pre-chamber assembly, which at least partly improves upon the mentioned negative effects compared to the prior art.

This aspect is achieved by a pre-chamber assembly for an internal combustion engine with the features of the claims as well as a cylinder head and an internal combustion engine having such a pre-chamber assembly.

According to certain embodiments of the invention, it is provided that the pre-chamber assembly comprises a distal end, which protrudes into a main combustion chamber when the pre-chamber assembly is mounted in the internal combustion engine, and a proximal end, the pre-chamber assembly comprising:

- a supply channel fluidically connected with a pre-chamber for supplying air, fuel or an air-fuel-mixture to the pre-chamber, which supply channel is disposed on the proximal end of the pre-chamber assembly,
- at least one transfer passage fluidically connecting the pre-chamber with the main combustion chamber when the pre-chamber assembly is mounted in the internal combustion engine, and
- a riser passage, which riser passage fluidically connects the pre-chamber with the at last one transfer passage, wherein the riser passage is oblique with respect to a longitudinal axis of the pre-chamber assembly, ignition means for igniting an air-fuel-mixture in the pre-chamber, the ignition means being arranged on the proximal end of the pre-chamber assembly, wherein the ignition means comprises a sealing area configured to seal the pre-chamber against the environment and a mounting portion, characterized in that the sealing area of the ignition means is arranged between the mounting portion of the ignition means and the pre-chamber.

On the one hand, by an arrangement of the sealing area between the mounting portion of the ignition means, which may for example be provided by an external thread of the spark plug and the pre-chamber, the mounting portion can be kept clean of deposits of the combustion (e.g., soot), which directly affects the thermal conductivity.

On the other hand, sealing the ignition means between the mounting portion and the pre-chamber (sealing area between the mounting portion and the pre-chamber) leads to increased effective contact area between the ignition means and the surrounding component part (e.g., the cylinder head or the spark plug sleeve) and thus enhances the thermal conductivity or the heat transfer, respectively (wherein a better heat exchange can be generated).

Therefore, the oblique riser passage with the desired effect of increased turbulence in the pre-chamber can be used without negatively impacting the lifetime of the ignition means. The result is a pre-chamber assembly with better performance without an increased maintenance requirement.

Already present internal combustion engines can be upgraded with at least one pre-chamber assembly according to embodiments of the invention.

All measures and features described in connection with the prior art can also be taken in connection with embodiments of the invention.

According to certain embodiments of the invention, the riser passage is oblique with respect to the longitudinal axis of the pre-chamber assembly if it is not parallel to the longitudinal axis of the pre-chamber assembly. In embodiments of the invention, a riser passage axis of the riser passage can intersect the longitudinal axis of the pre-chamber assembly, such that the longitudinal axis of the pre-chamber assembly and the riser passage axis confine an angle of inclination. In other embodiments of the invention, the riser passage axis does not intersect the longitudinal axis of the pre-chamber assembly.

Advantageous embodiments are defined in the dependent claims.

According to certain embodiments of the invention, at least one transfer passage is provided to fluidically connect the pre-chamber with the main combustion chamber when the pre-chamber assembly is mounted in the internal combustion engine. Through the transfer passages, flame jets (which are generated by the combustion of the pre-chamber) can extend through the transfer passages into the main combustion chamber to ignite combustion in the main combustion chamber.

Preferably, it can be provided that a riser passage axis of the riser passage is oriented towards the ignition means, in particular, the ignition means of an ignition device. With such an orientation of the riser passage, a back flowing fluid from the main combustion chamber (during an exhaust stroke or compression stroke) can be directed at the ignition means.

Potentially, this can result in improved flow conditions in the vicinity of the ignition means and/or can have a cleaning effect on the ignition means, because of the back flowing fluid of the main combustion chamber, i.e., unwanted deposits in or near the ignition means can be purged or blown away.

Furthermore, by such a configuration, wherein the riser passage axis of the riser passage is oriented towards the ignition means, advantageous flow conditions can be generated, wherein the flame speed and the ignition conditions at the location of the ignition means can be improved.

Using a pre-chamber assembly, according to an embodiment of the invention, generates the possibility to use flow conditions, which have not been possible in past, because too much heat was delivered to the ignition means (wherein the ignition means was damaged, or the lifetime was reduced enormous). Using a configuration according to the invention makes it possible for the ignition means to generate a better heat dissipation to the surrounding elements, wherein the heat resistance of the ignition means can be increased.

For the purposes of this document, the riser passage being oriented towards the ignition means can be understood as the riser passage axis intersecting a half of the pre-chamber in which the ignition means is arranged. A half of the pre-chamber can be understood in terms of a plane through the longitudinal axis of the pre-chamber assembly bisecting the pre-chamber. If such a plane exists, such that the ignition means and the riser passage axis are in the same half, the riser passage is understood to be oriented towards the ignition means.

In some embodiments, the riser passage axis can intersect the ignition means. Embodiments where a riser passage axis of the riser passage or the transfer passage is oriented towards the pre-chamber gas valve, are in principle also conceivable.

During the combustion process in the main combustion chamber, air, air-fuel-mixture, flame jets and/or combusted materials are forced back to the pre-chamber, wherein a back flow of fluid is generated through the transfer passages into the pre-chamber.

Alternatively or additionally, it can be provided that the riser passage axis of the riser passage is oriented towards a centric portion at the distal end of the pre-chamber assembly.

It can be provided that that the ignition means and/or the supply channel is arranged asymmetrically at the pre-chamber. In other words, ignition means and/or the supply channel may be arranged, such that an ignition device axis of the ignition means or a supply channel axis of the supply channel on the one hand, and the central longitudinal axis of the pre-chamber assembly on the other hand, are parallel and/or at a positive, non-zero distance from each other.

It can be provided that longitudinal axes (supply channel axis, ignition device axis) of the ignition means and the supply channel are arranged parallel to each other.

It can be provided that that the ignition means comprises a spark plug with electrodes for creating an ignition spark. Alternatively or additionally, the ignition means may also be provided by optical ignition devices (e.g., laser spark plugs).

Preferably, it can be provided that that the ignition means comprises a wall, on which the sealing area and the mounting portion is arranged, and wherein the sealing area is preferably located at an end of the wall, which end faces the pre-chamber when the spark plug is mounted in the internal combustion engine.

The wall can preferably enclose the functional components of the ignition means, such as, for example, electrodes, electrode carriers, insulators, electrical circuitry.

Fuel injectors may under certain circumstances be used in connection with embodiments of the invention (then embodying the supply channel together with the pre-chamber gas valve). However, in preferred embodiments, the supply channel and the pre-chamber gas valve are not realized as an injector, i.e., in these preferred embodiments, there is no nozzle present at the supply channel on the side of the pre-chamber or at the pre-chamber gas valve.

Air, fuel, or an air-fuel-mixture can be supplied to the pre-chamber via the supply channel.

It can be provided that a pre-chamber gas valve is arranged in the supply channel, wherein the pre-chamber gas valve preferably comprises a check valve.

As the ignition means is mostly arranged (in commonly known embodiments of the state of the art) centrically at the pre-chamber and the assembly space of the pre-chamber assembly is limited, it is known in the prior art to arrange the pre-chamber gas valve in a supply channel of the pre-chamber, the supply channel being arranged peripherally to the ignition means. The pre-chamber gas valve is generally arranged at a certain distance from the pre-chamber in the prior art.

A disadvantage of such a configuration is that, during the combustion, the air-fuel-mixture present in the supply channel between the pre-chamber and the pre-chamber gas valve does not fully combust or only insufficiently combusts. This partial or insufficient combustion of the air-fuel-mixture at the supply channel increases the emissions of the combustion, especially the soot and HC-emissions Furthermore, deposits are built by the insufficient combustion of the air-fuel-mixture in the part of the supply channel between the pre-chamber and the pre-chamber gas valve. Already small deposits do have a significant effect on the functioning of the pre-chamber gas valve and can even congest the supply channel.

In the same way, condensate may develop in the supply channel between the pre-chamber gas valve and the pre-chamber, which additionally (negatively) influences the efficiency of the combustion process in the pre-chamber and therefore of the whole combustion process of the internal combustion engine.

It can be provided that the ignition means is arranged—preferably in a direction of or parallel to a longitudinal axis of the pre-chamber assembly—further from or at the same distance from the distal end of the pre-chamber assembly compared to the pre-chamber gas valve.

Preferably, it is provided that the ignition means is arranged directly at the pre-chamber.

By arranging the pre-chamber gas valve further from or at the same distance from the distal end of the pre-chamber assembly compared to the pre-chamber gas valve (or in other words: arranging the pre-chamber gas valve closer at the pre-chamber as the ignition means), the length of the supply channel between the pre-chamber and the pre-chamber gas valve is reduced—preferably to a minimally possible length—, wherein the surfaces at which deposits can build and wherein deposits (as well as HC emissions) directly influencing the functionality of the pre-chamber gas valve are accordingly reduced or completely eliminated. Also, condensate development during the combustion process is reduced.

It can be provided that the pre-chamber gas valve directly faces the pre-chamber. This means that there is no portion of the supply channel between the pre-chamber gas valve and the pre-chamber, wherein all small and filigree geometries of the supply channel between the pre-chamber gas valve and the pre-chamber, which are mainly affected by deposits (and the functionality of which are mainly affected by already small deposits), may be reduced to an absolute minimum.

Consequently, by reducing these dead-volumes which comprise air-fuel-mixture volumes not or insufficiently combusted during the combustion process by such embodiments, the emissions are reduced, maintenance work is reduced, a higher combustion efficiency is reached, and a more reliable functionality of the pre-chamber assembly is achieved.

Furthermore, the length between the distal end and the proximal end of the pre-chamber assembly, can be reduced.

Comparing the distance of the ignition means and the pre-chamber gas valve from the distal end of the pre-chamber assembly, respectively, the distal most portions of the ignitions means, and the pre-chamber gas valve should be compared. Therefore, the pre-chamber gas valve may reach at least as far towards the distal end of the pre-chamber assembly as the ignition means.

The pre-chamber supply channel may in general comprise a first part—before the pre-chamber gas valve—in which a fuel gas or a mixture of air and fuel is present under a certain pressure, and a second part—after the pre-chamber gas valve—which is in permanent and direct fluid communication with the pre-chamber. The pre-chamber gas valve may also be arranged so close to the pre-chamber that this second part is not actually present or is basically a part of the pre-chamber. The mentioned first part is also known as pre-chamber rail.

It can be provided that, viewed along a longitudinal axis of the pre-chamber assembly, the pre-chamber gas valve overlaps the ignition means. By overlapping of the pre-chamber gas valve and the ignition means, a preferably small assembly dimension is reached. The assembly can be built as compact as possible.

It can be provided that the ignition means is arranged at the same distance—preferably in a direction of or parallel to a longitudinal axis of the pre-chamber assembly—from the distal end of the pre-chamber assembly compared to the pre-chamber gas valve.

It can be provided that the pre-chamber gas valve is arranged further—preferably in a direction of or parallel to a longitudinal axis of the pre-chamber assembly—from the distal end of the pre-chamber assembly compared to the ignition means.

It can be provided that the riser passage passes into the pre-chamber at an opposite side of the pre-chamber gas valve and/or an opening in the pre-chamber where the supply channel enters the pre-chamber with respect to a longitudinal axis of the pre-chamber assembly.

BRIEF DESCRIPTION OF THE DRAWINGS

Further details and advantages of the invention are apparent from the accompanying figures and the following description of the drawings.

FIG. 6 illustrates a fifth embodiment of the invention, and

FIG. 7 illustrates a side view of the embodiment of FIG. 6.

DETAILED DESCRIPTION

Figure 1:
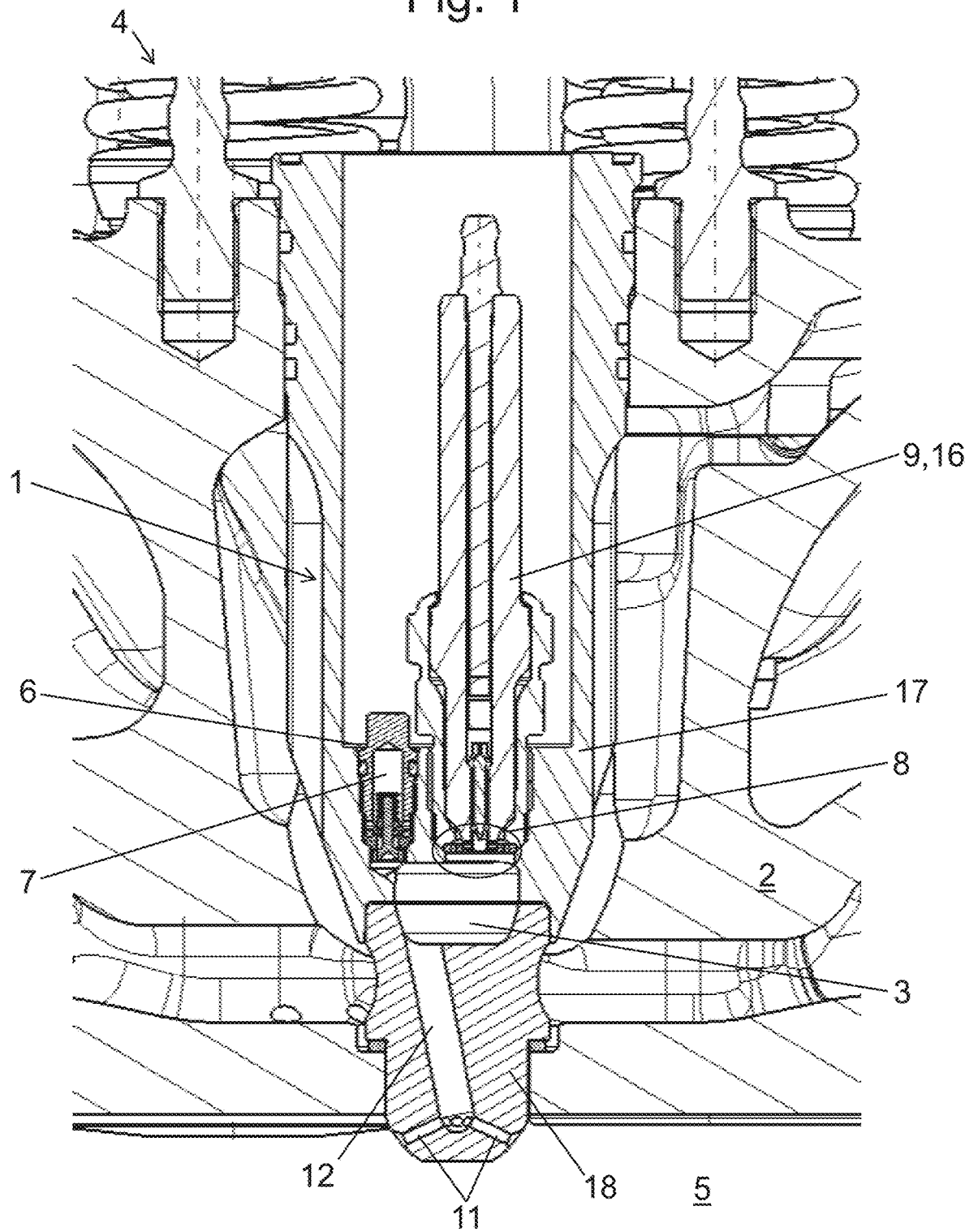
FIG. 1 illustrates a first embodiment of the invention.

FIG. 1 shows a first embodiment of the present invention, wherein the pre-chamber assembly 1 is arranged in a cylinder head 2 of an internal combustion engine 4.

Figure 2:
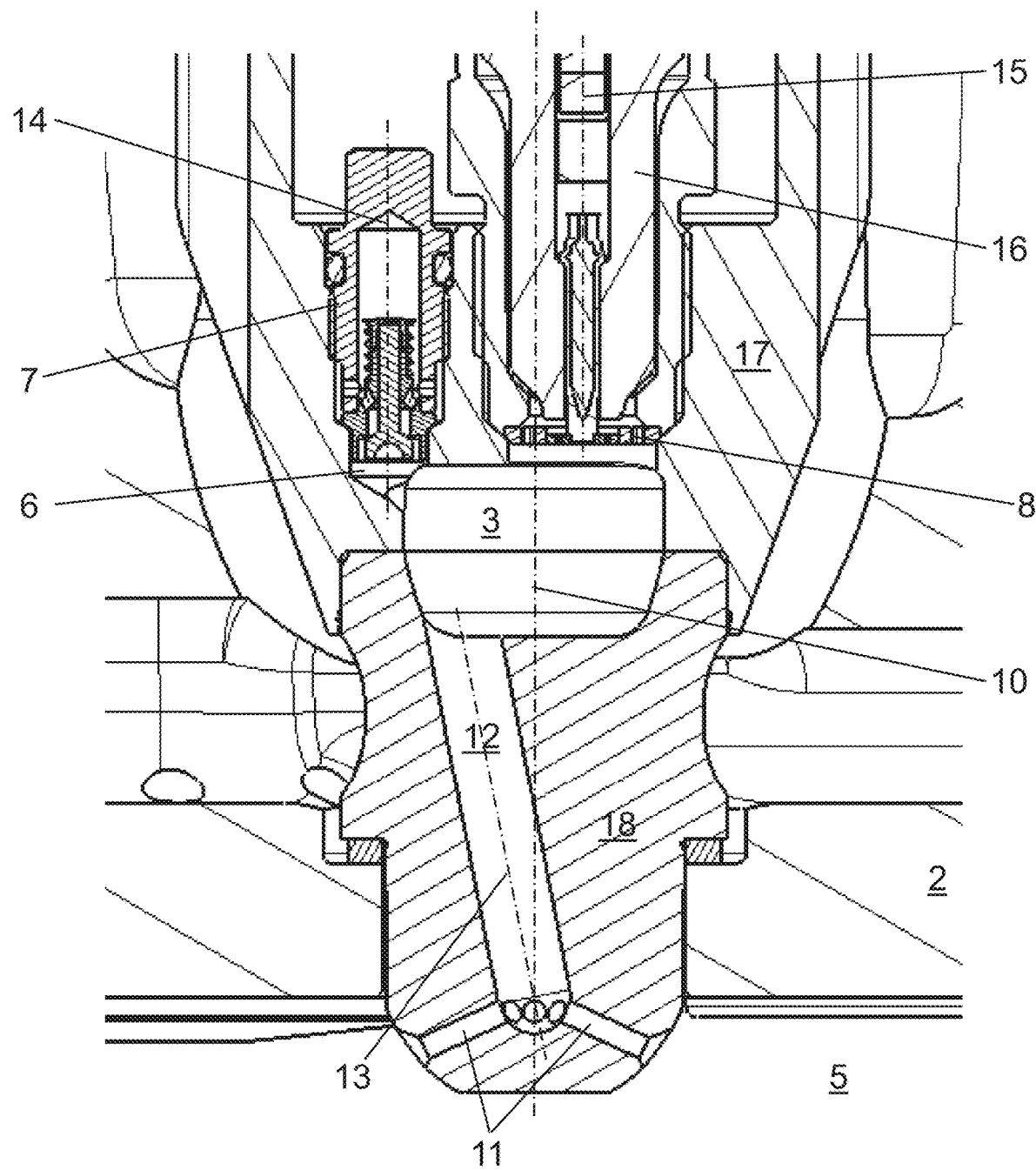
FIG. 2 illustrates a detailed view of the embodiment shown by FIG. 1.

FIG. 2 represents a detail view of FIG. 1, wherein the region of the pre-chamber 3 and the components arranged therein are depicted in a scaled up manner.

The pre-chamber 3 shown by this specific embodiment is formed by two separate components, which form a cavity in the mounted state. The upper part forming the pre-chamber 3 is a spark plug sleeve 17 and the lower part a pre-chamber body 18, which are connected.

The spark plug sleeve 17 and the pre-chamber body 18 are placed in a cylinder head 2 of an internal combustion engine 4, wherein the pre-chamber body 18 (forming the distal end of the pre-chamber assembly 1) protrudes into a main combustion chamber 5 of the internal combustion engine 4.

The spark plug sleeve 17 carries the pre-chamber gas valve 7 and the ignition means 8 (in this embodiment, a spark plug 16), wherein the spark plug sleeve 17 comprises an upper opening which forms the proximal end of the pre-chamber assembly 1.

The pre-chamber gas valve 7 (in this embodiment, realised by a check valve) is arranged in the supply channel 6, wherein through the pre-chamber gas valve 7 and the supply channel 6, air, fuel, or an air-fuel-mixture can be supplied to the pre-chamber 3.

The spark plug 16 comprises electrodes of an ignition device 8 (e.g., ignition means 9) for creating an ignition spark and for igniting an air-fuel-mixture in the pre-chamber 3.

The ignition means 9 is arranged further from the distal end of the pre-chamber assembly 1 compared to the pre-chamber gas valve 7. This reduces the distance between pre-chamber 3 and pre-chamber gas valve 7 to a minimum, wherein regions for potential deposits and condensates resulting from the combustion process are minimized.

The ignition means 9 is arranged in a direction of a longitudinal axis 10 of the pre-chamber assembly 1 further from the distal end of the pre-chamber assembly 1 compared to the pre-chamber gas valve 7.

The ignition means 9 and/or the supply channel 6 is arranged asymmetrically at the pre-chamber 3, wherein viewed along a longitudinal axis 10 of the pre-chamber assembly 1, the pre-chamber gas valve 7 overlaps the ignition means 9.

The axis 14 of the supply channel 6 and the axis 15 of the ignition means 9 are parallel to each other. Furthermore, the axis 14 of the supply channel 6 and the axis 15 of the ignition means 9 are arranged parallel to the longitudinal axis 10 of the pre-chamber assembly 1

Transfer passages 11 are provided to fluidically connect the pre-chamber 3 with the main combustion chamber 5, wherein the transfer passages 11 connect the main combustion chamber 5 with an riser passage 12 which riser passage 12 fluidically connects the pre-chamber 3 with the at last one transfer passage 11.

The riser passage axis 13 of the riser passage 12 is oblique with respect to a longitudinal axis 10 of the pre-chamber assembly 1, wherein a lower end of the riser passage axis 13 is oriented towards a centric portion at the distal end of the pre-chamber assembly 1 (i.e., the riser passage axis 13 and the longitudinal axis 10 of the pre-chamber assembly 1 intersect). At the upper end of the riser passage axis 13 of the riser passage 12, the riser passage axis 13 is oriented towards the pre-chamber gas valve 7.

Figure 3:
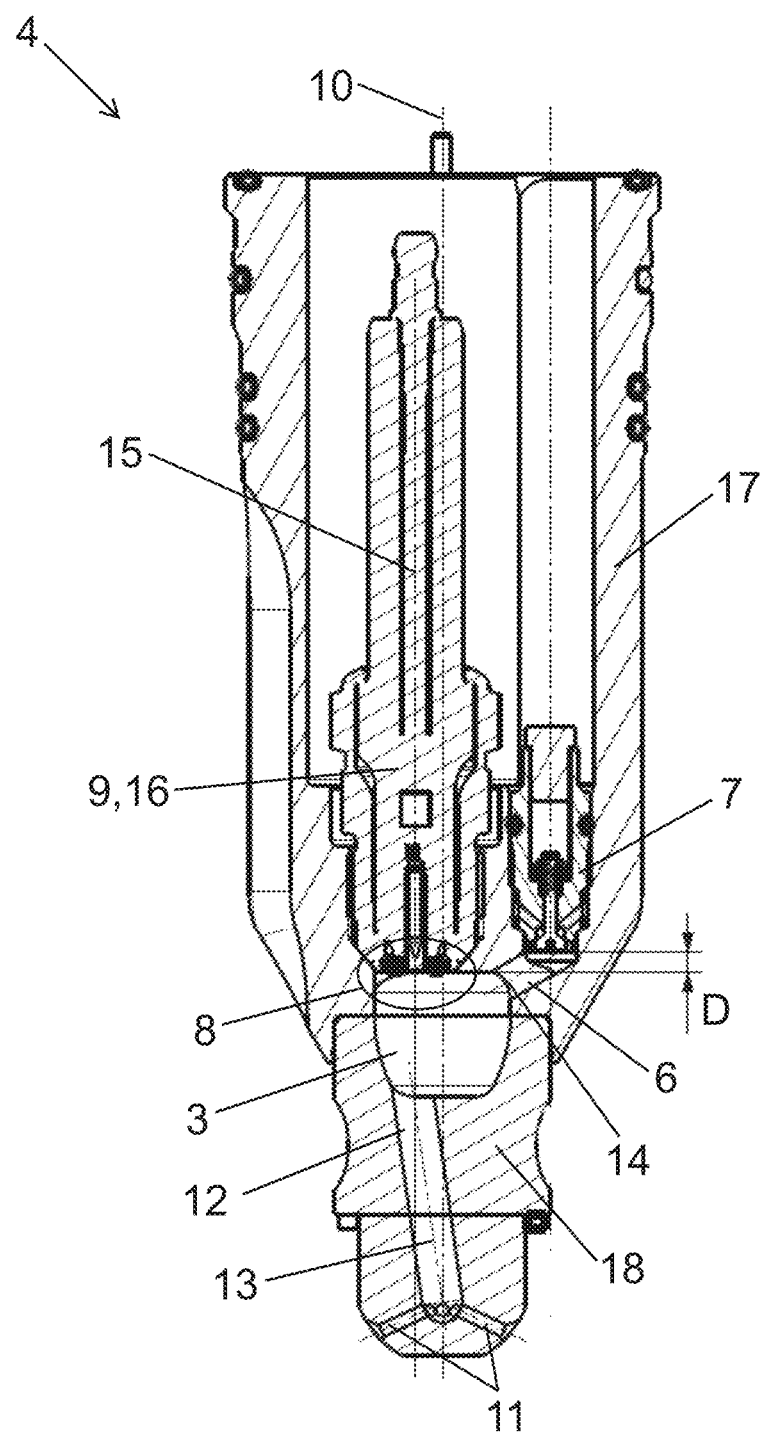
FIG. 3 illustrates a second embodiment of the invention.

FIG. 3 shows a second embodiment of the present invention, wherein (compared with the first embodiment) the pre-chamber gas valve 7 is arranged further from the distal end of the pre-chamber assembly 1 compared to the ignition means 9.

The ignition means 9 is arranged in a direction of the longitudinal axis 10 of the pre-chamber assembly 1 (measured parallel to the axis 10) closer by a distance D to the distal end of the pre-chamber assembly 1 as the pre-chamber gas valve 7.

Figure 4:
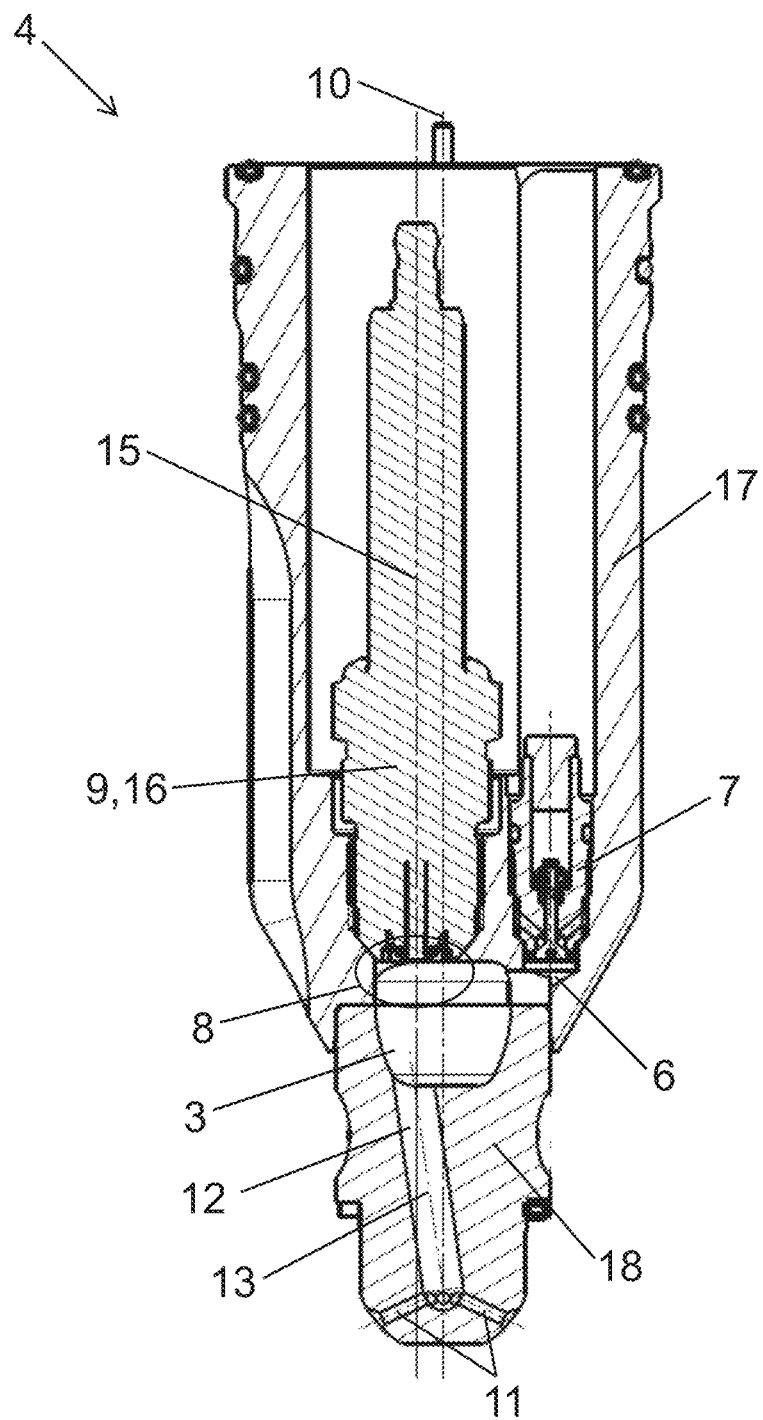
FIG. 4 illustrates a third embodiment of the invention.

FIG. 4 shows a third embodiment of the present invention, wherein ignition means 9 is arranged at the same distance from the distal end of the pre-chamber assembly 1 compared to the pre-chamber gas valve 7.

Figure 5:
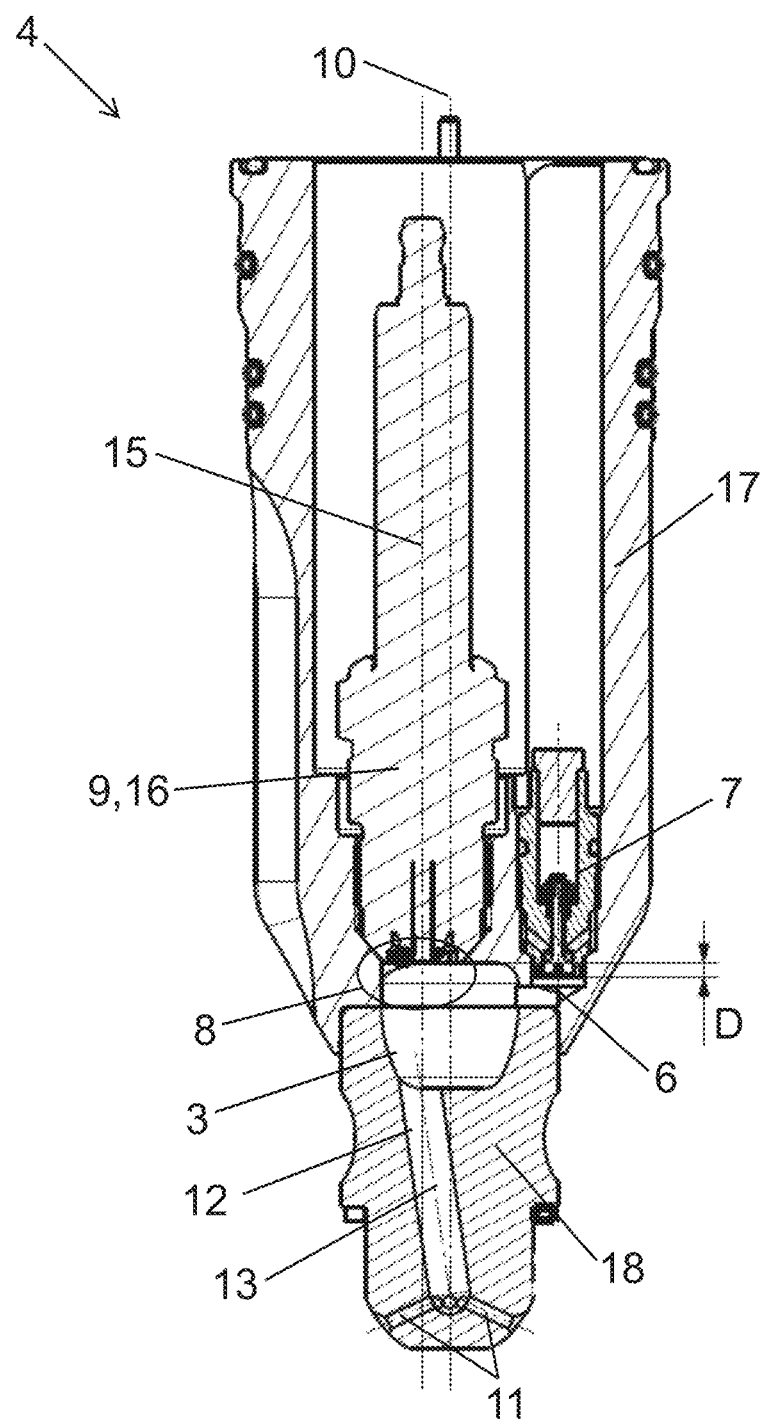
FIG. 5 illustrates a fourth embodiment of the invention.

FIG. 5 shows a fourth embodiment of the present invention, wherein the ignition means 9 is arranged further from the distal end of the pre-chamber assembly 1 compared to the pre-chamber gas valve 7.

The pre-chamber gas valve 7 is arranged closer by a distance D to the distal end of the pre-chamber assembly 1 in a direction of the longitudinal axis 10 of the pre-chamber assembly 1 (measured parallel to the axis 10) as the ignition means 9.

FIG. 6 shows a fifth embodiment of the present invention, wherein the ignition means 9 is arranged closer to the distal end of the pre-chamber assembly 1 as the pre-chamber gas valve 7.

FIG. 7 shows a side view of the embodiment presented by FIG. 6.

According to certain embodiments of the invention, the riser passage 12 (connecting the transfer passages 11 with the pre-chamber 3) of the fifth embodiment is arranged oblique with respect to the longitudinal axis 10 of the pre-chamber assembly 1. Therefore, the riser passage axis 13 is arranged oblique, in particular inclined (in other words, at an angle), with respect to the longitudinal axis 10 of the pre-chamber assembly 1.

Compared to the previous embodiments, the embodiment presented by FIG. 6 and FIG. 7 discloses an oblique riser passage 12, which is inclined in a plane at a right angle to a plane, in which the longitudinal axis 10 of the pre-chamber assembly 1 and the axis 14 of the supply channel 6 and the axis 15 of the ignition device 8 is arranged.

Formulated differently, the riser passage axis 13 is oriented towards the ignition means 9 in the sense that the riser passage axis 13 intersects the same half of the pre-chamber 3 in which also the ignition means 9 is arranged.

In the embodiments shown by the FIG. 3-7, the riser passage axis 13 of the riser passage 12 is oriented towards the ignition means 9, wherein the riser passage 12 passes into the pre-chamber 3 at an opposite side of the pre-chamber gas valve 7 (and therefore of the opening in the pre-chamber 3, where the supply channel 6 enters the pre-chamber 3) with respect to a longitudinal axis 10 of the pre-chamber assembly 1.

LIST OF USED REFERENCE SIGNS 1 pre-chamber assembly
2 cylinder head
3 pre-chamber
4 internal combustion engine
5 main combustion chamber
6 supply channel
7 pre-chamber gas valve
8 ignition device
9 ignition means
10 axis of the pre-chamber assembly
11 transfer passage
12 riser passage
13 axis of the riser passage
14 axis of the supply channel
15 axis of the ignition device
16 spark plug
17 spark plug sleeve
18 pre-chamber body
D distance

The invention claimed is:

1. A system, comprising:
a pre-chamber assembly for an internal combustion engine with a distal end, which protrudes into a main combustion chamber when the pre-chamber assembly is mounted in the internal combustion engine, and a proximal end, the pre-chamber assembly comprising:
  a supply channel fluidically connected with a pre-chamber, wherein the supply channel is configured to supply air, fuel, or an air-fuel-mixture to the pre-chamber, wherein the supply channel is disposed on the proximal end of the pre-chamber assembly;
  at least one transfer passage fluidically connecting the pre-chamber with the main combustion chamber when the pre-chamber assembly is mounted in the internal combustion engine; and
  a riser passage, wherein the riser passage fluidically connects the pre-chamber with the at last one transfer passage, wherein the riser passage is oblique with respect to a longitudinal axis of the pre-chamber assembly;
an igniter configured to ignite an air-fuel-mixture in the pre-chamber, wherein the igniter is arranged on the proximal end of the pre-chamber assembly, wherein the igniter comprises a sealing area and a mounting portion disposed directly about a wall of the igniter, the sealing area is configured to seal the igniter to the pre-chamber assembly between the mounting portion and the pre-chamber, and the sealing area of the igniter is arranged between the mounting portion and an end portion of the igniter facing the pre-chamber.

2. The system as set forth in claim 1, wherein a riser passage axis of the riser passage is oriented directly towards the end portion of the igniter.

3. The system as set forth in claim 1, wherein the igniter and the supply channel are arranged asymmetrically at the pre-chamber, a first longitudinal axis of the igniter is offset by a first distance from the longitudinal axis of the pre-chamber assembly, a second longitudinal axis of the supply channel is offset by a second distance from the longitudinal axis of the pre-chamber assembly, and the first and second distances are different from one another.

4. The system as set forth in claim 1, wherein longitudinal axes of the igniter and the supply channel are arranged parallel to each other and offset from the longitudinal axis of the supply channel.

5. The system as set forth in claim 1, wherein the igniter comprises a spark plug with electrodes for creating an ignition spark.

6. The system as set forth in claim 1, wherein the sealing area is located at an end of the wall of the igniter.

7. The system as set forth in claim 1, wherein the mounting portion comprises threads, and the sealing area is configured to block leakage from the pre-chamber to the threads.

8. The system as set forth in claim 1, wherein a pre-chamber gas valve is arranged in the supply channel, the pre-chamber gas valve comprises a check valve, and the igniter is arranged further from the distal end of the pre-chamber assembly compared to the pre-chamber gas valve.

9. The system as set forth in claim 1, wherein a pre-chamber gas valve is arranged in the supply channel, the pre-chamber gas valve comprises a check valve, and the igniter is arranged at the same distance from the distal end of the pre-chamber assembly compared to the pre-chamber gas valve.

10. The system as set forth in claim 1, wherein a pre-chamber gas valve is arranged in the supply channel, the pre-chamber gas valve comprises a check valve, and the pre-chamber gas valve is arranged further from the distal end of the pre-chamber assembly compared to the igniter.

11. The system as set forth in claim 1, wherein the riser passage passes into the pre-chamber at an opposite side of the pre-chamber gas valve and/or an opening in the pre-chamber where the supply channel enters the pre-chamber with respect to the longitudinal axis of the pre-chamber assembly.

12. The system as set forth in claim 1, wherein the pre-chamber gas valve is arranged directly at the pre-chamber.

13. The system as set forth in claim 1, further comprising a cylinder head having the pre-chamber assembly.

14. The system as set forth in claim 13, further comprising the internal combustion engine having the pre-chamber assembly, the cylinder head, and one or more reciprocating pistons.

15. A system, comprising:
a pre-chamber assembly configured to couple to an internal combustion engine, wherein the pre-chamber assembly includes:
  a supply channel configured to supply air and/or fuel into a pre-chamber;
  an igniter receptacle configured to mount an igniter in fluid communication with the pre-chamber, wherein the igniter receptacle comprises a mounting portion and a sealing area configured to extend directly about a wall of the igniter, the mounting portion comprises threads, the sealing area is configured to seal the igniter to the pre-chamber assembly between the mounting portion and the pre-chamber, and the sealing area is disposed between the mounting portion and an end portion of the igniter facing the pre-chamber;
  at least one transfer passage configured to couple the pre-chamber with a main combustion chamber of the internal combustion engine; and
  a riser passage between the pre-chamber and the transfer passage, wherein the riser passage is oblique relative to a longitudinal axis of the pre-chamber assembly.

16. The system as set forth in claim 15, wherein the supply channel and an igniter are arranged on a proximal end of the pre-chamber assembly, wherein the riser passage is configured to direct a backflow from the main combustion chamber directly toward the end portion of the igniter to help remove unwanted deposits.

17. The system as set forth in claim 16, wherein a first longitudinal axis of the igniter is offset by a first distance from the longitudinal axis of the pre-chamber assembly, and a riser passage axis of the riser passage is angled away from the longitudinal axis of the pre-chamber assembly toward the igniter and intersects with the end portion of the igniter.

18. A method, comprising:
supplying air and/or fuel into a pre-chamber via a supply passage of a pre-chamber assembly, wherein the pre-chamber assembly is configured to couple to an internal combustion engine, the pre-chamber assembly comprises at least one transfer passage configured to couple the pre-chamber with a main combustion chamber of the internal combustion engine, and the pre-chamber assembly comprises a riser passage between the pre-chamber and the transfer passage;
sealing an igniter mounted within an igniter receptacle in fluid communication with the pre-chamber, wherein the igniter receptacle comprises a mounting portion and a sealing area configured to extend directly about a wall of the igniter, the mounting portion comprises threads, the sealing area seals the igniter to the pre-chamber assembly between the mounting portion and the pre-chamber, and the sealing area is disposed between the mounting portion and an end portion of the igniter facing the pre-chamber; and
directing a backflow from the main combustion chamber through the rise passage into the pre-chamber, wherein the riser passage is oblique relative to a longitudinal axis of the pre-chamber assembly.

19. The method as set forth in claim 18, wherein directing the backflow comprises directing the backflow through the rise passage into the pre-chamber directly toward the end portion of the igniter to cause a cleaning effect to help remove deposits from the igniter.

20. The method as set forth in claim 19, wherein directing the backflow comprises directing the backflow through the rise passage into the pre-chamber on a first side of the longitudinal axis having the igniter, wherein supplying the air and/or fuel into the pre-chamber occurs on a second side of the longitudinal axis, and the first and second sides are opposite from one another.

\* \* \* \* \*